Patented Aug. 14, 1928.

1,680,866

UNITED STATES PATENT OFFICE.

JOHN E. FUNK, OF STOCKTON, CALIFORNIA, ASSIGNOR TO FUNK SOIL PULVERIZER COMPANY, OF STOCKTON, CALIFORNIA, A CORPORATION.

GROUND-WORKING IMPLEMENT.

Application filed September 27, 1926. Serial No. 137,884.

This invention relates to improvements in agricultural implements, and particularly to one of the rotary type for working the earth.

The principal object of my invention is to provide a machine for the purpose by means of which, with the forward movement of the machine, a strip of ground of considerable width will at one operation be thoroughly plowed and turned over; all weeds will be uprooted and destroyed; all clods will be broken up; and the ground will be thoroughly pulverized and left in a smooth condition for planting without the necessity of any subsequent cultivating operations being carried out.

A further object of the invention is to provide digging blades of such a nature and so arranged that they enter and engage the ground with a minimum of power expenditure, and which cut through any underlying roots in the ground whether such roots extend longitudinally or transversely of the line of travel of the implement, and will chop such roots into small pieces.

Another object is to mount these digging elements in such a manner that any one may be easily removed and replaced in the event of breakage or excessive wear.

Still another object of the invention is to provide means for preventing the dissemination of dust from the pulverized earth to the surrounding atmosphere, and for causing all clods not thoroughly broken up by the initial engagement of the blades therewith to be subsequently acted on; and if such action fails, to cause the clods to be delivered onto the ground ahead of the path of movement of the blades.

A fifth object is to provide means for enabling the blades to be supported while engaged with the ground in such a manner that the depth of engagement will be constant irrespective of irregularities in the contour of the ground over which the implement and its draft means is travelling.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
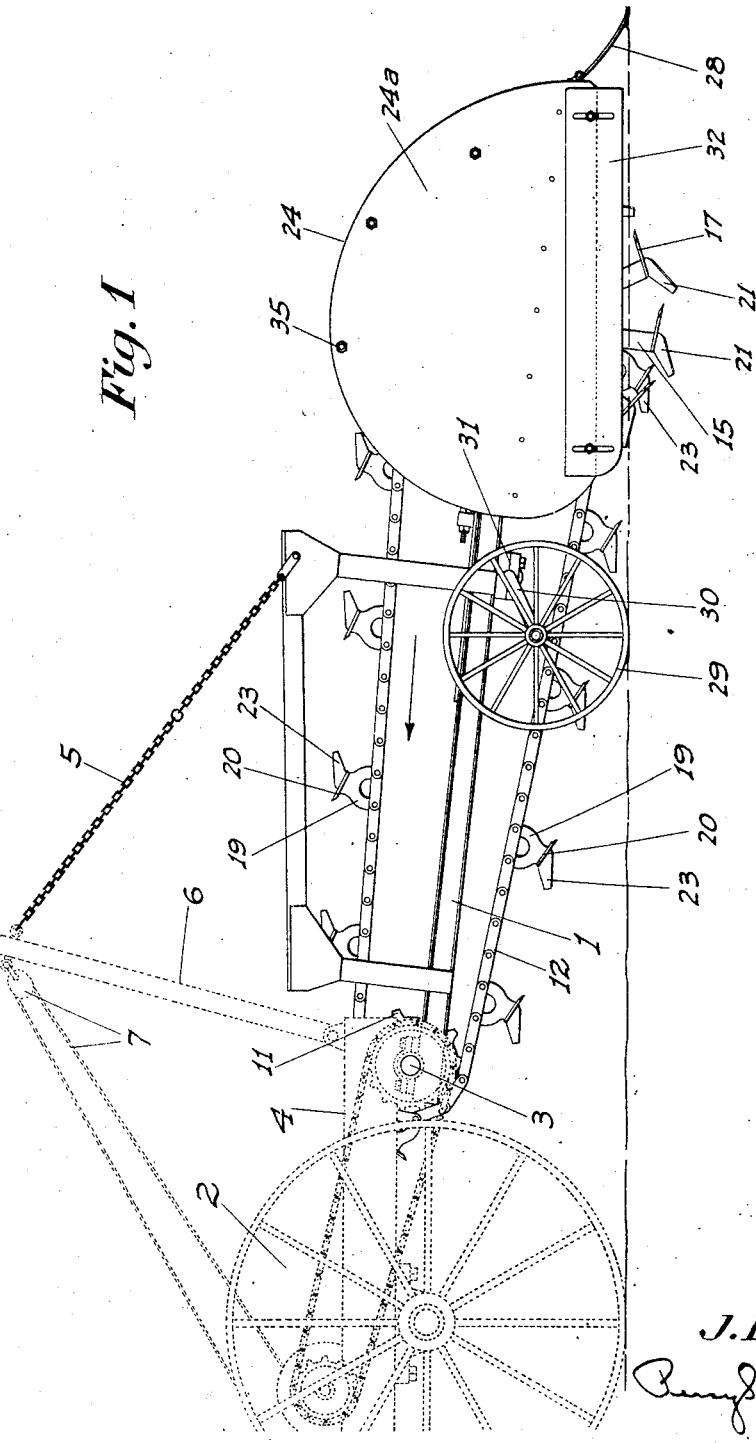
Fig. 1 is a side elevation of my improved implement in its operating position.

Referring now more particularly to the characters of reference on the drawings, the numeral 1 denotes a boom structure arranged to extend rearwardly of a pull or draft implement 2 of any suitable character. The boom at its forward end has a transverse shaft 3 which is turnably mounted on the boom and on the frame 4 of the implement 2. To the rear end of the boom is applied a raising and lowering means, here shown as a chain 5 extending to derrick arms 6 pivoted on the frame 4, with a block and tackle mechanism, as indicated at 7, extending from the forward ends of the arms and connected to the implement 2 to be manipulated therefrom. It is to be understood however that the particular means of mounting and supporting the boom, and the particular form of draft means form no part of this invention, which deals solely with the ground working structure mounted in connection with the boom, and hereinafter described.

Slidably and adjustably mounted in and projecting rearwardly from the boom, and actually forming a part thereof is an extension 8 which is formed at its rear end with transversely spaced bearings 8ª for a transverse shaft 9 which is turnably mounted in said bearings. Fixed centrally on said shaft is a sprocket wheel 10, while fixed on the shaft 3 in longitudinal alinement with said sprocket wheel 10 is another sprocket wheel 11, an endless chain 12 of substantial character passing about said sprockets. The shaft 3 is driven in any suitable manner, and in that direction which will cause the lower periphery of the chain to travel opposite to the direction of movement of the implement as a whole, or in other words in the same direction as the supporting wheels of the draft implement.

Fixed on the shaft 9 on each side of the sprocket wheel 10 in spaced relation to said sprocket wheel and to each other are spiders each comprising a hub 13 having radial arms 14 provided with radial grooves 14ª in one face thereof. Radial arms 15 seat at their inner ends in said grooves, each arm being securely but removably held in place by a bolt 16 passed through the arms 15 and 14. On the outer ends of the arms 15, which are longer than the radius of the sprocket wheel 10, are affixed transversely extending blades in the form of flat plates 17, which are disposed substantially at right angles to the radial plane of the arms. The forward or ground entering edges of these plates are sharpened on their inner faces, as shown at 18, and have also a diverging slope transversely each way from their center of width. This provides a shearing action when the plates are in the ground, reducing the power necessary to operate the same and enabling roots and the like to be readily cut through. The blades are so disposed that with the rotation of the arms in the direction previously described, said blades will engage and enter the ground at an angle similar to that at which the ordinary spade is set. Thus a slice of the ground will be cut by each blade whose width is that of the blade (the side edges of which act as cutting edges also just as those of a spade), and whose length depends upon the distance the machine has travelled forward since the previous blade in the same transverse plane engaged the ground.

Figure 2:
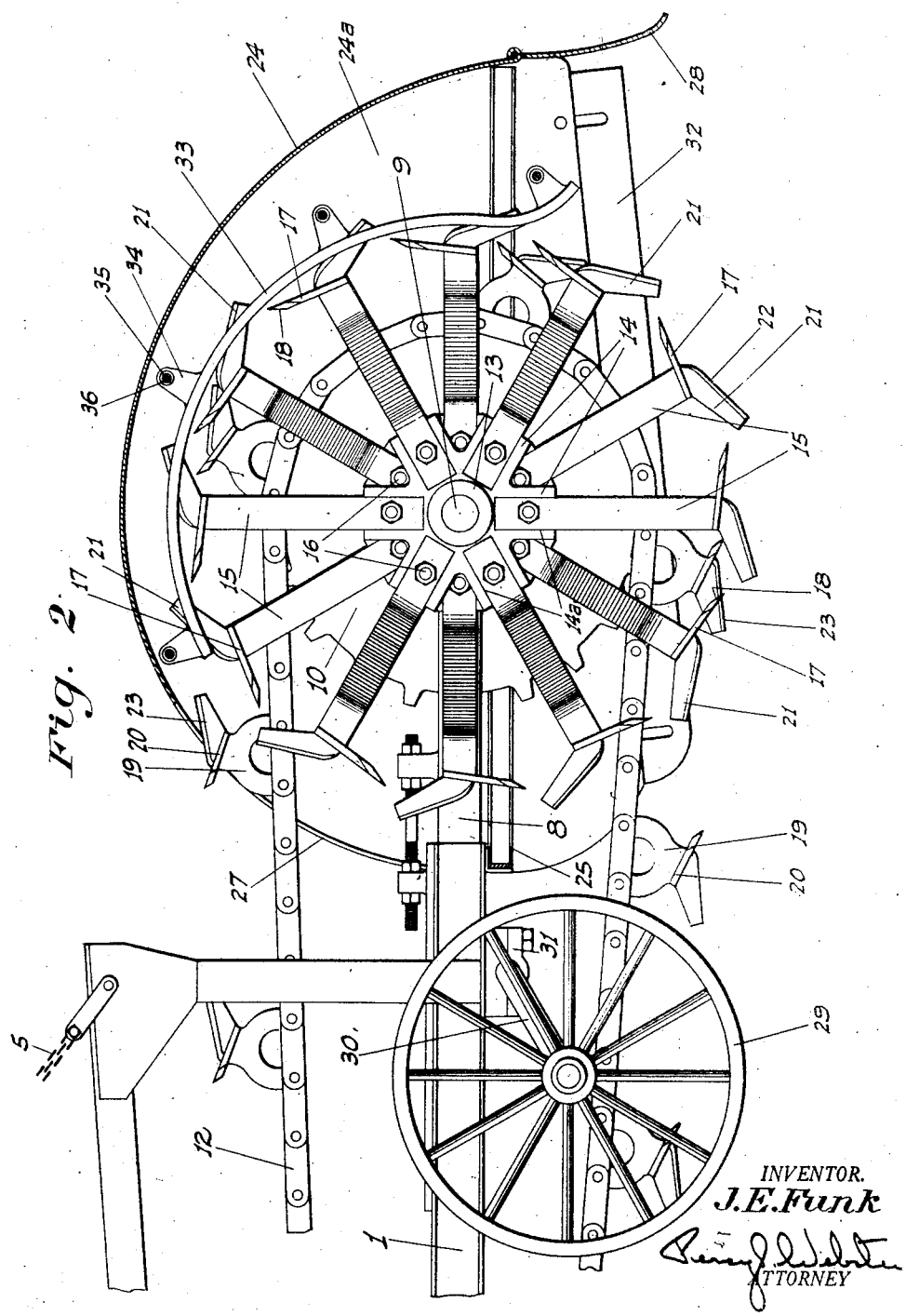
Fig. 2 is an enlarged sectional elevation of the implement in a raised position.

At intervals the links of the chain 12 carry outwardly projecting arch brackets 19 on which are mounted transversely extending blades 20 which are disposed at a suitable forward slant to the ground in the direction of the ground engaging movement, and are sharpened on their forward edges. These blades lie in a transverse plane between the plane of the adjacent spider blades, and when passing around the sprocket wheel 10 are disposed so as to lie in a circumferential plane between an adjacent pair of the blades 17, as shown in Fig. 2. The number of links in the chain, the number of teeth in the sprocket wheel 10, and the number of blades on the chain are so proportioned that said blades 20 always assume the above named positions relative to the blades 17. This arrangement insures that the chain-blades, when moving around the rear sprocket, will always be disposed between the blades 17 with a definite clearance. This will prevent said blades 20, when they move longitudinally of said sprocket with the chain, from possibly catching against any of the adjacent transversely spaced and continuously rotating blades 17, and permits the adjacent side edges of the chain and rotating blades to be very closely alined with each other, as is desirable. The outwardly arched brackets 19 which I employ in mounting the chain blades enables the teeth of the sprocket wheel to engage the corresponding links to which these brackets are attached, without any danger of such links becoming clogged up with dirt.

There are six arms attached to each spider. One opposite pair of such arms are straight, another opposed pair is outwardly offset at their outer ends, and the remaining pair is inwardly offset at their outer ends. This offsetting is sufficient to cause the respective blades on the three sets of arms to lie in adjacent transverse planes, as clearly shown in Fig. 3.

Similarly the arms of the other spiders are offset relative to each other and to those of the other spiders so that all the blades on said spiders, as well as the chain blades, will lie in adjacent transverse planes, so that with the rotation of the ground working structure all the ground transversely of the path of movement of the machine will be worked by the various blades. The arms of alternate spiders are also offset circumferentially relative to each other, as shown, so that the blades of the different spider arms are disposed in different positions circumferentially relative to each other and to the chain blades. This relative circumferential position of the blades is so proportioned that with one revolution of the cutter only two cutters at a time simultaneously make their initial cut into the earth. These two cutters are those occupying corresponding and equally spaced positions on opposite sides of the transverse center line of the cutter shaft 9. By reason of this construction and operation the cutting action of the cutter as a whole is perfectly balanced while at the same time the power requirements to advance the vehicle and cutter forward are much less than where the full line of cutters make the initial cut into the ground at the same time. I have observed them both ways and with my construction all the parts can be made much lighter since there is not as heavy a jar or resistance to the mechanism where only two at a time of the cutters take their "bite" as there is where a whole line engages the ground surface at the same time. Thus the permissible lightness of the machinery requires less power to drive same and also there is less back drag on the power unit as the cutters engage the ground and this further minimizes power consumption. I preferably employ two spiders on each side of the chain, but the shaft 9 may be lengthened and more spiders added if a machine of greater scope of operations is desired.

Figure 3:
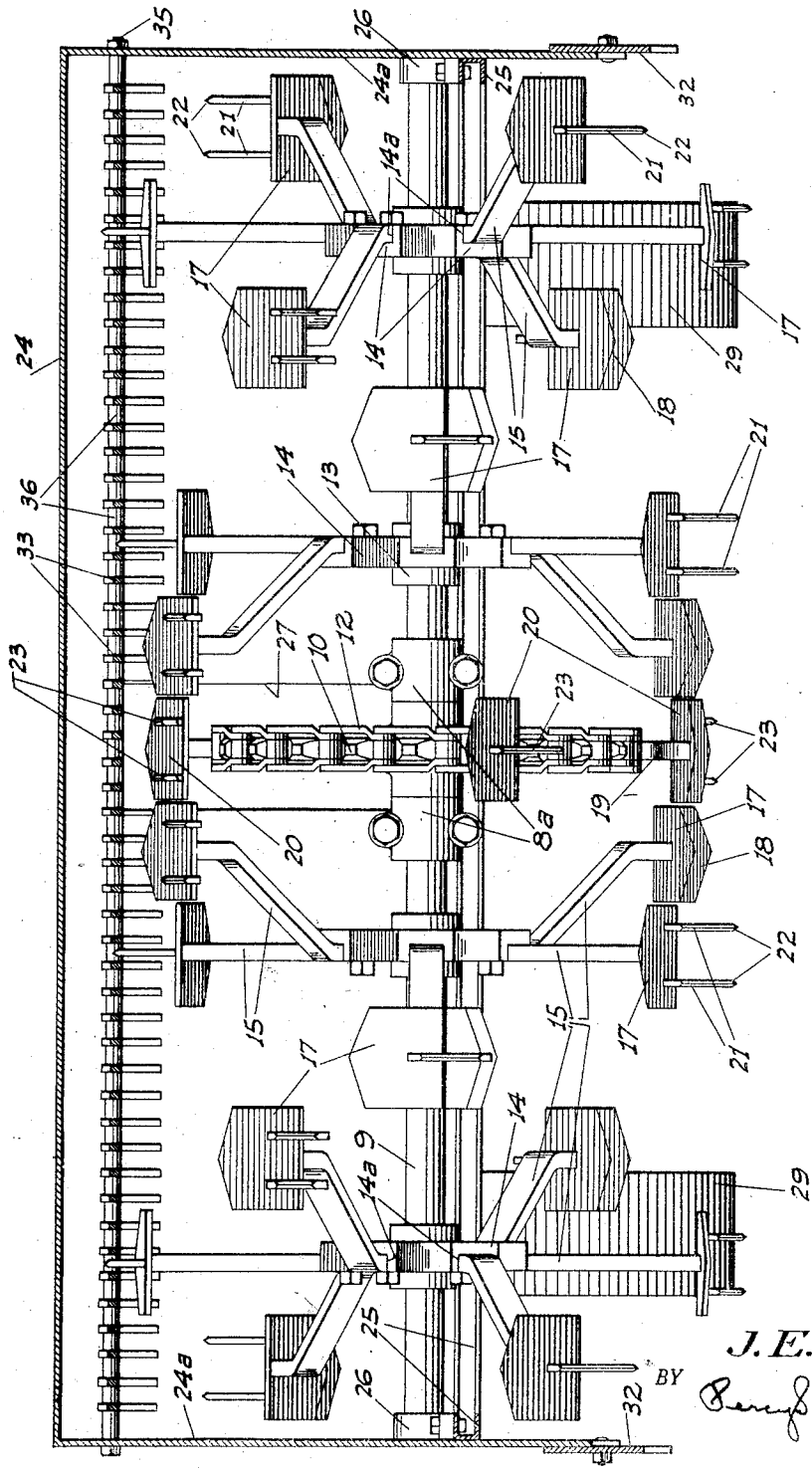
Fig. 3 is a rear end view of the implement with the enclosing hood and associated parts being partly removed.

Each blade 17 has one or more longitudinally extending fins 21 projecting from the outer face of the same in a transverse plane at right angles thereto and rearwardly relative to the direction of movement of the blades. The outer longitudinal edges of these fins, which extend at an obtuse angle to the adjacent faces of the blades 17, are sharpened as at 22 to readily cut through the ground and the roots therein. On the different blades 17, both circumferentially and transversely, the arrangement of the fins is alternated, so that while one blade has a single centrally located fin, the adjacent blade circumferentially and transversely spaced therefrom, has two fins equally offset from the center; the next correspondingly located blade has again a single fin, and so on, as shown in Fig. 3. This arrangement insures that with the rotation of the digging structure the different transversely cut slices or clods of earth, as cut by the blades 17, will then be cut into small pieces longitudinally relative to the movement of the machine. The various fins are so disposed relative to each other and to the side edges of the blades 17 (which edges determine the width of the individual slices) that all such small pieces will be of equal width. The chain blades 20 are also provided with similarly positioned fins 23. The rear and outermost ends of the cutting edges of the fins are some distance further away from the axis of rotation than are the cutting edges of the blades 17, so that they cut to a greater depth than the said blades. Therefore, while each individual blade cuts the earth ahead of the fins on the same blade, the earth is already cut into longitudinally, in transversely spaced planes and prior to the engagement of any blade 17 therewith, by the fins of the blades ahead in the same plane and which have already passed through the ground. This greatly facilitates the work of the blades and lessens the strain thereon, since the ground is already partly broken up before said blades engage the same. Also the setting of the fins relative to the blades and to the axis of rotation of the structure is such that the cutting edges of the fins move through the earth with a shearing action, thus consuming relatively little power. Though I preferably use the fins under ordinary conditions, they may, if necessary or found desirable, be omitted under other conditions.

The blades and fins are permanently welded onto the respective arms 15 so that if a blade or fin breaks or wears out, the arm must be replaced. This is an easy matter however, since it is only necessary to remove the single bolt 16. The one bolt is ample for the purpose, since the main strain on the arms is not taken by the bolt but by the side edges of the grooves in the spider arms in which the inner ends of the arms 15 are seated.

The speed of rotation of the digging structure is considerably in excess of the speed of advancing movement of the machine, and with such rotation the dirt is thrown upwardly and rearwardly, and with certain kinds of dirt clouds of fine dust are formed and thrown into the air. To catch the dirt and dust I enclose that portion of the digging structure which is always above ground by a hood having a curved top portion 24 and vertical sides 24ª. This hood structure is rigidly supported in connection with the digging structure, so as to move with the same when the member 8 is adjusted relative to the boom, by suitable means such as a beam 25 bent to form side portions outwardly of the outermost blades 17 and supported from the shaft by bearings 26 thereon; and a transverse portion connected to the member 8 ahead of the digging structure. The top member of the hood at the front above the beam is vertically slotted as at 27 to allow the chain and its blades to pass therethrough; and below the beam is open all the way across between the sides. A transverse apron 28 is hinged onto the hood member 24 at its rear end, so as to rest on and drag along the ground when the digging members are lowered to their operative position. This apron prevents any dust from being thrown rearwardly between the bottom of the hood and ground, and as well acts to smooth out the ground already acted on by the digging structure.

To support the boom adjacent its rear end independently of the chain 5 when the digging elements are in the ground, and to insure that such elements will be maintained at a given depth in the ground, I mount a pair of ground engaging wheels 29 to the sides of the boom just ahead of the digging structure. These wheels are mounted on the outer ends of crank arms 30 which are adjustably clamped in boxes 31 mounted on the boom. It will therefore be seen that by turning the crank arms one way or the other, the height of the axis of the wheels 29 relative to the boom will be altered. Then when the boom is lowered the wheels rest on the ground, while the digging elements depend the desired distance into the ground, as shown in Fig. 1. This distance will then be maintained without appreciable variation, and regardless of irregularities of the ground contour owing to the close positioning of such wheels relative to the digging structure. The wheels being spaced widely apart also serve to steady the relatively narrow boom and prevent the lateral twisting of the same, such as would cause the shaft 9, and the parts secured thereto, to be deflected from a proper horizontal plane.

In order to enable the hood protection to be afforded to a point very close to the ground regardless of the depth to which the digging structure is set, I may mount vertically adjustable side plates 32 onto the hood sides 24ª. In constructing certain of these machines, however, I contemplate mounting the wheels 29 so as to be rigid or non-adjustable, so that the digging will be done to a certain fixed depth. In this case the rigid hood sides 24ª would extend to the fixed ground level, and the plates 32 would be omitted.

With the operation of the digging structure, it sometimes happens that the clods are not thoroughly broken up by the passage of the different blades through the earth, and are whirled rearwardly and upwardly along with the dust, being then caught by the hood and thrown forwardly of the same to drop onto the ground ahead of the digging structure. Such clods would therefore be very liable to be again engaged by the blades and thoroughly broken up. To cause such clods, however, to be preferably cut up during the movement inside the hood, I mount a plurality of transversely spaced bars 33 which are disposed concentric with the shaft 9 between the blades 17 and the top of the hood, and positioned so that the various fins 21 pass between the bars. It will therefore be seen that any clods resting on and extending across adjacent bars will be cut through by the fins as they pass between said bars. These bars at their rear ends extend to a point somewhat above the normal ground level, so as not to interfere with the throwing up movement of the clods to engage the hood. These bars have outwardly projecting lugs 34 at spaced intervals, through which bolts 35 extend to the sides of the hood, with spacers 36 on said bolts between the lugs, so as to maintain the bars in properly spaced relation. This arrangement enables the fins to project through and beyond the bars without danger of the bar securing means being engaged by the fins.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a ground working implement, a ground working unit comprising a central member adapted to be rotated, a plurality of radial and circumferentially spaced arms mounted on said member, and transverse ground engaging blades mounted at the outer ends of the arms and disposed substantially at right angles to the radial lines of the arms, said arms having their inception in a common plane but being alternately offset toward their outer ends in a transverse plane, whereby the blades will be disposed in transversely spaced vertical planes.

2. In a ground working implement, a ground working unit including a rotatable structure, transverse cutting elements mounted on said structure and arranged to enter the ground at an angle to cut into the same transversely, and an additional longitudinal cutting element mounted in connection with each first named element and arranged to engage and cut the ground subsequent to the engagement of said first named element therewith.

3. In a ground working implement, a ground working unit including a rotatable structure, transversely extending cutting elements mounted on said structure and arranged to enter the ground at an angle with the rotation of the unit, and a longitudinal cutting fin projecting outwardly and rearwardly from each element; the outer longitudinal edge of said fin being sharpened and its rear end being a greater distance from the axis of the unit than the cutting edge of the blade.

4. In a ground working implement, a ground working unit including a rotatable structure and transverse flat ground engaging blades mounted on said structure in circumferentially spaced relation to each other and disposed substantially tangential to said structure, and a fin projecting rearwardly and outwardly from each blade; the outer edge of the fin being sharpened and being disposed at an obtuse angle to the outer face of the blade.

5. In a ground working implement, a ground working unit including a rotatable structure and transverse ground engaging blades mounted on said structure in circumferentially spaced relation to each other, and a cutting fin projecting at right angles to the transverse plane of each blade, the fins on adjacent blades lying in offset transverse planes relative to each other.

6. In a ground working implement, a transverse shaft, a plurality of circumferentially spaced cutting elements mounted in connection with the shaft, a sprocket wheel on the shaft, a driving sprocket wheel spaced from the shaft, an endless chain passing about and engaged by said sprocket wheels, and cutting elements mounted at intervals on the chain; the length of the chain, the number of cutting elements thereon, and the number of teeth on the shaft sprocket wheel being so proportioned relative to each other that the cutting elements on the chain, when moving around the shaft sprocket wheel with the driving of the chain, always assume the same positions relative to the first named cutting elements.

In testimony whereof I affix my signature.

JOHN E. FUNK.